United States Patent [19]

Odaka

[11] Patent Number: 5,172,380
[45] Date of Patent: Dec. 15, 1992

[54] DIGITAL SIGNAL TRANSMISSION APPARATUS

[75] Inventor: Kentaro Odaka, Tokyo, Japan

[73] Assignee: Sony Corporation, Tokyo, Japan

[21] Appl. No.: 771,847

[22] Filed: Oct. 3, 1991

Related U.S. Application Data

[63] Continuation of Ser. No. 370,620, Jun. 23, 1989, abandoned.

[30] Foreign Application Priority Data

Jun. 30, 1988 [JP] Japan .................. 63-163667

[51] Int. Cl.⁵ .................. G113 20/18; G113 20/12
[52] U.S. Cl. .................. 371/37 A; 360/48
[58] Field of Search .................. 371/37.4, 50.1, 51.1; 360/53, 48, 49; 358/343

[56] References Cited

U.S. PATENT DOCUMENTS 4,551,771 11/1985 Machida et al. .................. 360/19.1
4,630,272 12/1986 Fukami et al. .................. 371/37
4,656,536 3/1987 Furumoto et al. .................. 360/72.2
4,682,332 7/1987 Okamoto et al. .................. 371/38
4,819,088 4/1989 Higurashi .................. 360/19.1
4,903,148 2/1990 Amano et al. .................. 360/13

FOREIGN PATENT DOCUMENTS

0222386A3 5/1987 European Pat. Off. .

Primary Examiner—Stephen M. Baker
Attorney, Agent, or Firm—Philip M. Shaw, Jr.

[57] ABSTRACT

A digital signal transmission method in which a digital signal having a header block of a predetermined length is transmitted. The header is comprised of a synchronization signal and auxiliary data. The auxiliary data is made up of first data or second data and a redundant error detection code. The redundant code indicates whether the block contains the first data as the auxiliary data or the second data as the auxiliary data so that different headers having different contents can be distinguished by the reproduction apparatus.

2 Claims, 11 Drawing Sheets

NTSC SYSTEM (16 BITS)

CCIR SYSTEM (16 BITS)

NTSC SYSTEM (12 BITS)

CCIR SYSTEM (12 BITS)

Fig. 7

| Fig. 7A | Fig. 7B | Fig. 7C | Fig. 7D |

Fig. 7A

| | k=0 | 1 | 2 | — — — — — | 19 | 20 | 21 |
|---|---|---|---|---|---|---|---|
| l=0 | | | | S Y N C | | | |
| 1 | E | E | E | E or E | E | E | E |
| 2 | ADu | ADu | ADu | Q or ADu | Q | ADu | ADu |
| 3 | ADl | ADl | ADl | Q or ADl | Q | ADl | ADl |
| 4 | | | | | Q | L1u | L441u |
| 5 | | | | | Q | L21u | L461u |
| 6 | | | | | Q | L1l | |
| 7 | | | | | Q | L21l | |
| ... | | | Q | | | | |
| 37 | | | | | | | |
| 38 | | | | | | | L761l |
| 39 | | | | | | | L781l |
| 40–47 | | | | | | | P |

(Fig. 9A, Fig. 9B regions indicated)

Fig. 7B

| 22 | 23 | 24 | 25 | 26 | 27 | 28 | -------- | 58 | 59 |
|---|---|---|---|---|---|---|---|---|---|
|  |  |  |  |  |  |  | S Y N C |  |  |
| E | $\overline{E}$ |  |  |  | $\overline{E}$ |  | $\overline{E}$ or E |  | E |
| ADu | SBu |  |  |  | SBu |  | SBu or ADu |  | SBu |
| ADl | SBl |  |  |  | SBl |  | SBl or ADl |  | SBl |
| R1u | R441u | L3u | L443u | R3u | R443u | L5u |  | R19u | R459u |
| R21u | R461u | L23u | L463u | R23u | R463u | L25u |  | R39u | R479u |
|  |  |  |  |  |  |  |  |  |  |
| 4 BLOCK LENGTH |  |  |  |  |  |  |  |  |  |
|  | [Fig. 9C] |  |  |  |  |  |  |  |  |
|  |  |  |  |  |  |  |  |  | R799u |
|  | R761l |  |  |  |  |  |  |  | R779l |
|  | R781l |  |  |  |  |  |  |  | R799l |
|  | P |  | P |  | P |  |  |  | P |

Fig. 7C

| 60 | 61 | 62 | 63 | 64 | 65 | 66 | 67 | 68 |
|---|---|---|---|---|---|---|---|---|
| E | E | E | E | E | | | | |
| ADu | ADu | ADu | SBu | ADu | | | | |
| ADl | ADl | ADl | SBl | ADl | | | | |
| L2u | L442u | R2u | R442u | L4u | L444u | R4u | R444u | L6u |
| L22u | L462u | R22u | R462u | L24u | L464u | R24u | R464u | L26u |
| L2l | | | | | | | | |
| L22l | | | | | | | | |

| | | 94 | 95 | 96 | 97 | 98 | 99 |
|---|---|---|---|---|---|---|---|
| S Y N C | | | | | | | |
| E or E | | | E | E | | | E |
| SBu or ADu | | | LOu | ADu | | | ROu |
| SBl or ADl | | | LOl | ADl | | | ROl |
| | | | R458u | L20u | L460u | R20u | R460u |
| | | | R478u | L40u | L480u | R40u | R480u |
| | | | | | | | |
| | | | | [Fig. 9D] | | | |
| | | | | | L800u | | R800u |
| | | | | | L800l | | R800l |
| | | | | P | P | | P |

Fig. 8

| | k=20 | 21 |
|---|---|---|
| l=0 | SYNC | |
| 1 | E | E |
| 2 | ADu | ADu |
| 3 | ADl | ADl |
| 4 | L1u | L441u |
| 5 | L21u | L461u |
| 6 | L1l | |
| 7 | L21l | |
| 8 | L41u | L481u |
| 9 | L61u | L501u |
| 10 | L41l | |
| 11 | L61l | |
| 12 | L81u | L521u |
| 13 | L101u | L541u |
| 14 | | |
| 15 | | |
| 16 | L121u | L561u |
| 17 | L141u | L581u |
| 18 | | |
| 19 | | |
| 20 | L161u | L601u |
| 21 | L181u | L621u |
| 22 | | |
| 23 | | |

| | k=20 | 21 |
|---|---|---|
| 24 | L201u | L641u |
| 25 | L221u | L661u |
| 26 | | |
| 27 | | |
| 28 | L241u | L681u |
| 29 | L261u | L701u |
| 30 | | |
| 31 | | |
| 32 | L281u | L721u |
| 33 | L301u | L741u |
| 34 | | |
| 35 | | |
| 36 | L321u | L761u |
| 37 | L341u | L781u |
| 38 | | L761l |
| 39 | | L781l |
| 40 | L361u | P10 |
| 41 | L381u | P00 |
| 42 | | P11 |
| 43 | | P01 |
| 44 | L401u | P12 |
| 45 | L421u | P02 |
| 46 | | P13 |
| 47 | | P03 |

5,172,380

DIGITAL SIGNAL TRANSMISSION APPARATUS

This is a continuation of co-pending application Ser. No. 07/370,620 filed on Jun. 23, 1989, now abandoned.

BACKGROUND OF THE INVENTION

1. Field of the Invention

The present invention relates to an encoding apparatus and method for error correction which is applied to record, for instance, audio PCM signals onto a magnetic tape by rotary heads and, more particularly, to an apparatus and method for error correction which is provided in a digital encoder to record high quality audio PCM data, as disclosed in U.S. Pat. No. 4,551,771.

2. Description of the Background Art

There is a known error correction encoding apparatus and method for use with information symbols arranged two-dimensionally in a matrix form in which encoding processes of error detection and error correction codes, e.g., Reed-Solomon codes are executed in each of the vertical and lateral directions of the information symbols. These codes are transmitted for each column (referred to as a block) in the vertical direction. On the reception side, the error correction is performed by using a first error detection and error correction code (referred to as a C1 code or sometimes referred to herein as a first error detection code) and, at the same time, a pointer indicative of the presence or absence of errors is formed. Next, the errors are corrected by a second error detection and error correction code (referred to as a C2 code or sometimes referred to herein as a second error detection code) again with reference to this pointer.

In the case where the foregoing error correction encoded data is transmitted for each block, a block of data is constructed by the addition of a synchronization signal and a header consisting of auxiliary data such as a block address, a time code, etc. to the block. A two-dimensional arrangement is constructed by a plurality of blocks. Since redundancy increases when block addresses are added to all blocks, e.g., 100 blocks, it is desirable that block addresses should be contained in a part of some blocks and auxiliary data, etc., should be inserted into a corresponding part of other blocks by omitting the block addresses.

For example, in U.S. Pat. No. 4,630,272, there is shown a method whereby a sync signal and an address in which error detection can be independently performed by a CRC code are added to each column of data and to the parity data of a C1 code, thereby forming one block. In this method, as shown in FIG. 1A herein, for the address, the error detection can be executed by the CRC code and for the data portion (PCM audio signals), encoding processes of a first error correction code (the C1 code) and a second error correction code (the C2 code) are performed. In the case of the encoding in FIG. 1A, however, since the C1 code is not applied to the address, the protection against errors is insufficient.

To solve this problem, for example, as disclosed in U.S. Pat. No. 4,682,332 and as shown herein in FIG. 1B, an error correction encoding is proposed in which an encoding by a C1 code is also executed for the address.

When a header consists of only an address, the error correction encoding shown in FIG. 1B is useful. However, if PCM audio signals (main data) are included in the header in addition to the address, the encoding by the C1 code is only executed for the main data and there is a problem in that the protection for errors is insufficient for a reason to be mentioned later. Encoding by the C2 code of the whole header, including the address, to eliminate this drawback causes an inconvenience in that the data area in which the addresses are recorded is lost by the existence of the C2 parity.

To solve such a problem, as shown in FIG. 1C, the invention of the present patent application proposes an error correction encoding apparatus in which a whole header together with a data portion is C1 encoded and the encoding of a C2 code is performed for the main data included in the header, excluding addresses, thereby enabling adequate error protection for the main data included in the header, so that the main data can be recorded into the header part. The insertion of audio data into the header facilitates the adjustment of asynchronization between a picture which is reproduced from the tape and an audio sound by varying the number of audio data words which are included in a frame of data area. This error correction encoding apparatus is suitable when it is used in what is called an 8-mm VTR as disclosed in U.S. Pat. No. 4,551,771 in which both a video signal of one field and audio PCM signals of one field, i.e., time base compressed audio PCM signals are recorded on a magnetic tape by a signal scan.

In the already commercialized 8-mm VTR, the sampling frequency of the audio PCM signals is selected to be $2f_h$ ($f_h$: horizontal frequency). Therefore, the rotary heads which rotate at a frame frequency and the sampling system are synchronized, and the problem of asynchronization between an image and an audio sound does not occur. However, there is a problem in that the sampling frequency of the conventional 8-mm VTR is too low with respect to that necessary for audio signals of a high quality to be recorded and reproduced. In addition, there is a problem in the absence of matching the sampling frequencies (44.1 kHz, 48 kHz, 32 kHz, etc.) which are used in other digital audio apparatuses such as CD players and rotary head type digital audio tape recorders (R-Dats). Therefore, it is preferable to be able to use those frequencies (44.1 kHz, 48 kHz, 32 kHz, etc.) as the sampling frequency of the audio PCM signals in the 8-mm VTR.

However, since the ratio between the above-mentioned frequency and, e.g., the field frequency (59.94 kHz) of the NTSC system is not an integer, the number of sampling data included in one field period is also not an integer. Therefore, when both a video signal and audio PCM signals are recorded on the same track, as in the 8-mm VTR, the problem of asynchronization between the video image and the corresponding audio sound may occur.

In this way, in the case where the sampling frequency cannot be evenly divided by a frequency of an encoded unit, for example, the field frequency, the sample number contained in one frame of a code structure varies by the number of plural ways close to the quotient of the division. Data processing on the reception side can be performed without any trouble by transmitting an identification signal indicative of the sample number. The foregoing PCM processor of 8-mm VTR is disclosed in U.S. patent application Ser. No. 262,523, now U.S. Pat. No. 4,953,168.

In the above-stated system, a two-symbol (16 bits) block address is inserted into a header, and a one-symbol block address is inserted into a block in which a one-symbol audio PCM signal is contained as auxiliary data. A block in which an audio PCM signal is included in a header is prescribed to have a block address of an odd-number i.e. whose least significant bit is "1". However, since the provision of one symbol of a block address to all blocks increases data redundancy, it is desirable to mix blocks having block addresses and blocks having data, such as an audio PCM signal other than an address, but having no block address. In this case, since no block address is added to the blocks in which data such as an audio PCM signal is inserted, it is impossible to distinguish a header content by the block address.

Therefore, the present invention identifies a header content by a redundant code of an error detection code which is added for an error detection of the block address, parity code Q, subcode and PCM signal included in the header only.

Although it is different from this invention, in one method utilizing a redundant code of an error detection code, one bit of the redundant code is allotted for identification. For example, one bit of an eight-bit redundant code is allotted for identification. In this system, since the remaining redundant code has seven-bits, one problem is that data processing in byte units becomes difficult. Also, when one bit of the eight-bits of redundant code is allotted to an identification bit, two kinds of headers corresponding to "0" and "1" can be identified.

By the allotment of two bits to identification bits, four kinds of headers corresponding to the four combinations of "0" and "1" can be identified. There are always a multiple of 2 kinds of headers available for identification. To identify three kinds, five kinds, etc., of headers, a system in which a partial bit of a redundant code is allotted to an identification bit is not possible and the next multiple of 2 must be used.

OBJECTS AND SUMMARY OF THE INVENTION

It is, therefore, an object of the present invention to provide a digital signal transmission apparatus which enables the mixture of a block having a block address and a block having no block address but having data such as an audio PCM signal and which is capable of identifying the content of a header by a pattern held by a syndrome that is formed during reproduction from an error detection code.

According to the present invention, there is provided a digital signal transmission apparatus for transmitting a digital signal having a header which is comprised of a synchronization signal and auxiliary data for each block of a predetermined length, the auxiliary data being made up of a first error code data signal or second error code data signal and a redundant code associated with the first error code data or the second error code data; and wherein the redundant code is formed so that syndrome patterns of the error code are different to distinguish during reproduction the block in which the first data is contained as the auxiliary data from the block in which the second data is contained as the auxiliary data.

A header consisting of a synchronization signal, auxiliary data and a redundant code of an error detection code for the auxiliary data is added to each block. Audio PCM signals are recorded as a frame of data unit having a plurality of blocks, for example, a two-dimensional array of symbols. In the two-dimensional array, data of one field of the audio PCM signal is contained. The data of one field is encoded by the C1 code and the C2 code, and a redundant code P of the C1 code and a redundant code of the C2 code are generated.

In the case of the NTSC system, the field frequency is 59.94 Hz, and in the case of a sampling frequency of 48 kHz, the sampling frequency cannot be evenly divided by the field frequency. That is, $48000 \div 59.94 = 800.8$. Two or more integers which are close to the quotient, for example, 800 and 801 are then chosen.

An identification signal indicative of the number of samples recorded as data of one field is transmitted together with those values. The reproduction side judges whether the sample number of one field is 800 or 801 from the identification signal. Therefore, while the number of samples in one field is an integer, the number of samples which is closest to the true quotient which is not an integer is recorded on an average and the occurrence of asynchronization between a video image and an audio sound can be prevented. In the two-dimensional arrangement of one frame in which the number of samples (or words) is 801, 800 samples are inserted into the data area and the remaining one sample (two samples in the case of two channels L/R) are inserted into a header. With respect to the two samples inserted into the header (four symbols when eight bits are encoded as one symbol in the case of one sample having 16-bit data), the encoding of both the C1 code and the C2 code can be performed. On the other hand, in a frame having 800 samples (or words), 800 samples are inserted into the data area, and no audio sample is inserted into the header. Therefore, a block with a header having an address signal and a block having no address signal are formed. Both blocks can be discriminated by a redundant code of an error detection code in the header. When a simple parity is employed as an error detection code, the distinction of two headers can be made by the inversion and non-inversion of the parity. The inversion is performed by adding (11111111) to the parity bits.

Therefore, according to the present invention, it is possible to set the content of a header of every block as desired, and an audio PCM signal, a time code, etc., can be inserted into the headers. With this, increased redundancy can be prevented and the degree of freedom of the format increases. Also, eight-bit data processing can be maintained although it is different from the case where one bit of the redundant code is employed as an identification bit. Further, there is an advantage in that there is no need to put a restriction that the number of kinds of headers to be identified is a multiple of 2.

The above, and other, objects, features and advantages of the present invention will become readily apparent from the following detailed description thereof which is to be read in connection with the accompanying drawings.

BRIEF DESCRIPTION OF THE DRAWINGS

FIGS. 7, 7A, 7B, 7C, 7D and 8 are diagrams illustrating an example of a data interleave;

DESCRIPTION OF THE PREFERRED EMBODIMENTS

An embodiment of the present invention will be described hereinbelow with reference to the drawings. This description will be made in the following order:
A. A block constitution and a frame constitution
B. An example of a data interleave
C. Constitution of a block
D. PCM recording processing circuit
E. Modification

A. A Block Configuration and a Frame Configuration

Figure 1A:
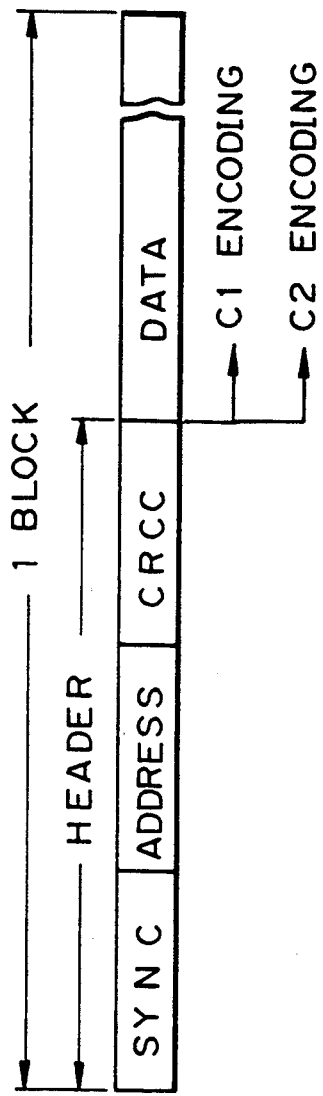
FIGS. 1A, 1B and 1C are diagrams of headers which are used in a conventional error correction code.
Figure 1B:
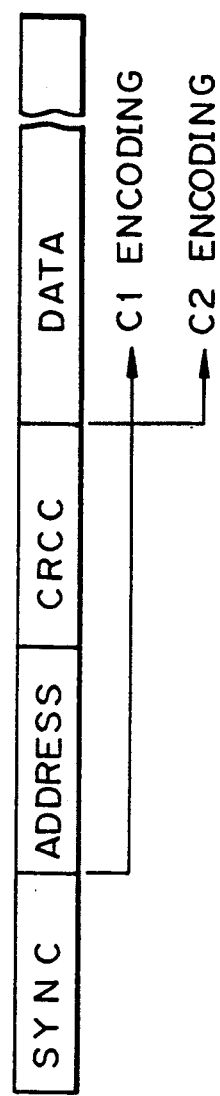
Figure 1C:
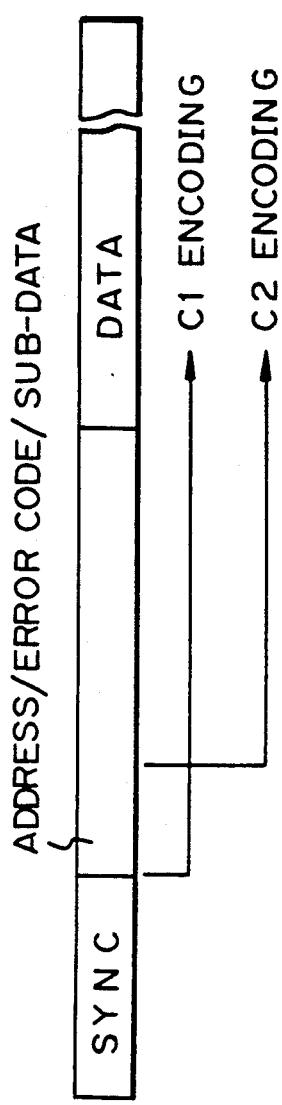
Figure 2:
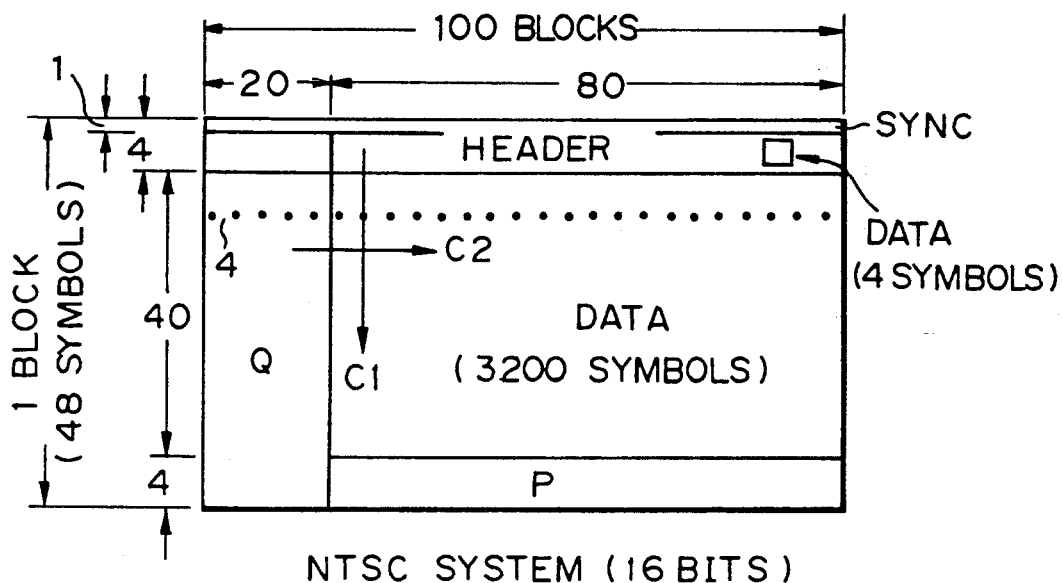
FIGS. 2, 3, 4 and 5 are diagrams of several examples of frame configuration to which this invention is applicable.
Figure 3:
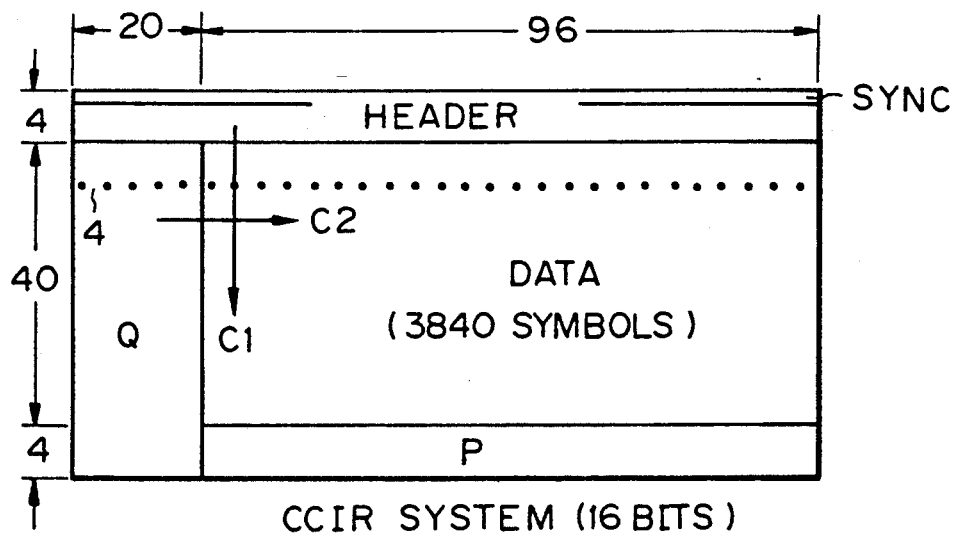
Figure 4:
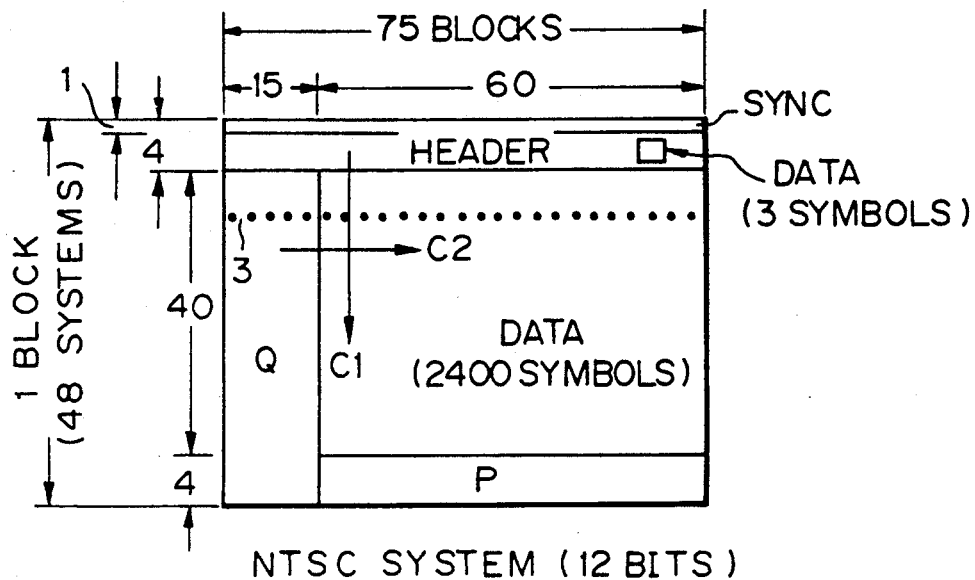
Figure 5:
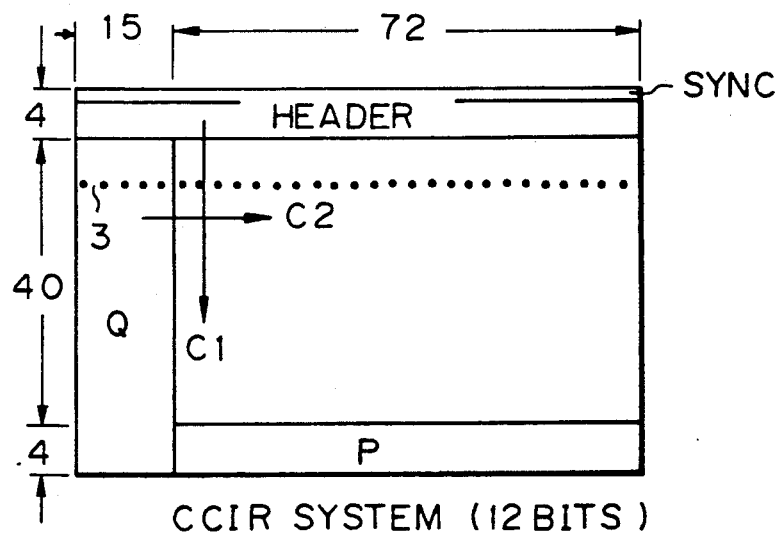

FIGS. 2 to 5 show several examples of a frame configuration to which the invention is applicable. FIG. 2 and FIG. 4 are frame configurations which are applicable to transmission of audio data of one field in the NTSC system. FIG. 2 shows a frame configuration in the case where one word consists of 16 bits, and FIG. 4 shows a frame configuration of 12 bits compressed from 16 bits. FIGS. 3 and 5 are frame configurations applicable to the encoding of audio data of one field in the CCIR system (PAL system or SECAM system). FIG. 3 shows a frame configuration in the case where one word has 16 bits, and FIG. 5 shows a frame configuration in the 12-bit case.

The provision of 12 bits or 16 bits as the length of one word is to provide a different recording wavelength depending on the kinds of magnetic tapes to be used. For example, in the case of a metal evaporated tape, the recording/reproduction of 16-bit data is performed, while the recording/reproduction of 12-bit data is carried out in the case of a metal coating tape.

In the case of the NTSC system, fields having 800 words per channel and fields having 801 words per channel are mixed. Thus, in the one-symbol-8-bit case, fields having 3200 (=800×2×2) symbols per two channels L/R and fields having 3204 (=801×2×2) symbols per two channels L/R are mixed. Audio data is arranged in a matrix form of 40×80 symbols (or bytes), and four symbols which occur in the transmission of a field having 801 words are inserted into a header. The header includes a synchronization signal to provide 4×100 symbols. The encoding of the C1 code is performed in the vertical direction of the two-dimensional array of data and headers, and in the horizontal direction, the encoding of the C2 code is carried out. However, as stated later, no encoding is performed for the C1 code and the C2 code with respect to the synchronization signal. With respect to a redundant code of an error detection code and a part of an auxiliary code in the header, the encoding of only the C1 code is made. The encoding of the C1 code and the C2 code is performed on a subcode (various ID code, and so on) of the auxiliary code and audio data (four symbols).

For the C1 code, the Reed-Solomon code with code length, information length, and distance of 47, 43, and 5, respectively, is employed, and check data P (four symbols) of the C1 code is generated. For the C2 code, a Reed-Solomon code of 25, 20, and 6 due to an interleave in the lateral direction every four blocks, is used to generate check data Q (5×4=20 symbols) of the C2 code.

In the case of 12-bit data in the NTSC system, the size in the vertical direction is increased to be equal to 16-bit data as shown in FIG. 4 to make the length in the lateral direction ¾-ths. The length of the interleave in the horizontal direction is changed to be 3, and for the C1 code and the C2 code, ones similar to the 16-bit data are used.

In the CCIR system, since the field frequency is 50 Hz, data of one field has 960 words in the case of the sampling frequency of 48 kHz. When the process is performed as an eight-bit symbol in two channels, 3840 symbols are provided. Consequently, the frame constitution shown in FIG. 3 is employed. The longitudinal length is selected to be 48 symbols which is equal to the frame configuration of the NTSC system, and the horizontal size is selected to be 116 blocks. The interleave length in the horizontal direction is selected to be four, and as the C2 code, a Reed-Solomon code is employed.

In the case of 12-bit data, as shown in FIG. 5, the horizontal length is selected to be 87 blocks, which is ¾-ths as compared with the frame configuration of FIG. 3. The interleave length of the C2 code is selected to be 3, and a C2 code similar to the C2 code for the 16-bit data is used.

The present invention is applicable to any one of the foregoing frame structures shown in FIGS. 2 to 5. In the CCIR system, since the sampling frequency (48 kHz) can be divided by the field frequency, all the words can be arranged in the data area of the frame. Also, the present invention is applicable to the case where auxiliary data such as a time code is inserted into a header in a CCIR system. The embodiment mentioned below is the case where the invention is applicable to the frame configuration (FIG. 2) of the 16-bit data in the NTSC system.

Figure 6:
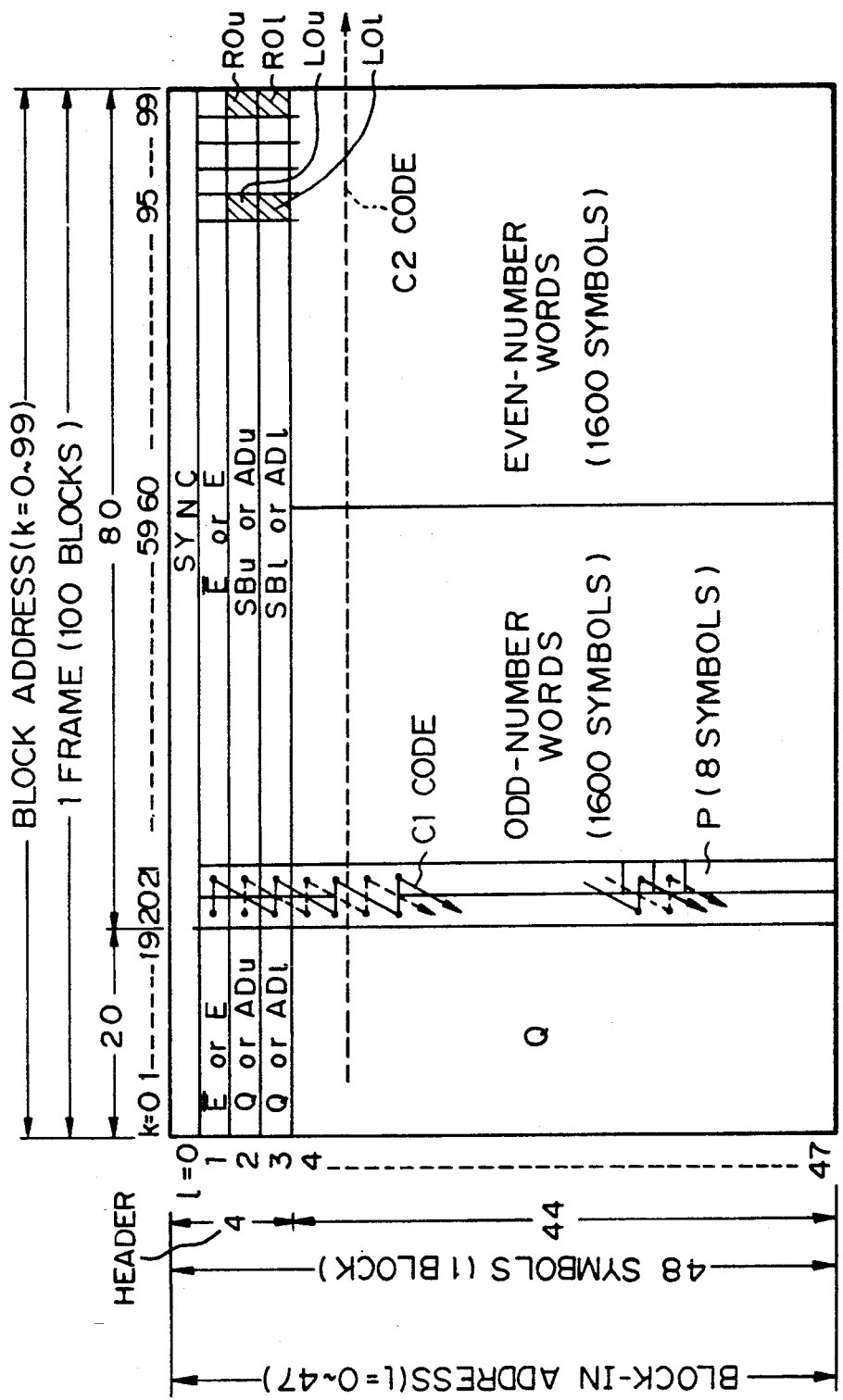
FIG. 6 is a diagram showing a frame configuration of one embodiment of the invention.

FIG. 6 shows the frame configuration shown in FIG. 2 in detail. One block is constituted by 48 symbols arranged in the vertical direction. A header is disposed at the head of one block. The header is comprised of a synchronization signal (one symbol) and an error check code, for the data of the header, for example, check data E or $\overline{E}$ (one symbol) of a simple parity and check data Q of the C2 code, an upper symbol ADu of an address signal, an upper symbol SBu of a subcode or upper symbols L0u, R0u of audio data and the check data Q of the C2 code, a lower symbol ADl of the address signal, and a lower symbol SBl of the subcode or lower symbols L0l R0l of the audio data. These data Q, ADu, ADl, SBu, L0u, R0u, SBl, L0l, R0l are inserted into the predetermined block selectively. A data area of 44 symbols is positioned after the header. The data area is made up of data (audio PCM signal), check data Q and check data P. One frame is constructed by arranging the above-mentioned blocks of 100 columns in the lateral direction. Block-in addresses l of 0 to 47 are added to 48 symbols in the longitudinal direction of the matrix-shaped frame construction and block addresses k of 0 to 99 are added to 100 blocks in the horizontal direction.

The audio PCM signal and check data P are contained in 44 symbols × 80 blocks of 20 to 99 of the block addresses k and 4 to 47 of the block-in addresses l. Since a video signal and a time-axis-compressed audio PCM signal are recorded onto a magnetic tape by a single scanning of the rotation heads, the amount of information of the audio PCM signal is contained in one field period. In the case of the sampling frequency of 48 kHz, the PCM audio signal of one field of the NTSC system are set to $$48{,}000 \times \frac{1}{59.94} = 800.8 \text{ (words)}.$$

As will be obvious from this equation, the sampling frequency cannot be divided by the field frequency. To solve this problem, in the frame configuration shown in FIG. 6, frames of both 800 words and 801 words which are recorded in mixed together fashion exist in a plurality of fields. However, in the following description of the code configuration, the frame configuration has 801 words. In the case of performing a linear digitization of 16 bits, each word is divided into an upper eight bits and a lower eight bits, and one symbol is set equal to eight bits.

Symbols L0u and R0u on the upper side of words L0 and R0 in the head of the audio PCM signals (L0 to L800, R0 to R800) of two channels, i.e., left channel and right channel are inserted in positions of l=2, k=95 and l=2, k=99 as indicated by a shaded line. Also, symbols L0l and R0l on the lower side are inserted into positions of l=3, k=95 and l=3, k=99 as indicated by a shaded line. 1600 symbols of odd-number designated words among the remaining 800 words in each channel are arranged in k=20 to 59, and 1600 symbols of even-number designated words are arranged in k=60 to 99.

The check data Q of the C2 code is contained in 20 blocks×44 symbols of k=0 to 19, l=4 to 47. The C2 code is the 25, 20, 6 Reed-Solomon code which is formed for groups of 20 symbols, every four blocks of symbols of which are arranged in the horizontal direction. Since four series of this C2 code are formed with respect to one row, the check data Q of 4×5=20 symbols is contained in one row. As a result, the encoding processes of the C1 and C2 code is performed for all symbols of 44 symbols×80 blocks of k=20 to 99, l=4 to 47.

However, encoding of the C1 code or the C2 code is not performed for a synchronization signal of l=0, k=0 to 99. For the check data E or $\bar{E}$ positioned at l=1, k=0 to 99, which are used for error detection of the data in the header, the encoding process of only the C1 code is performed, that is, the encoding process of the C2 code is not performed. As an error detection code, a simple parity is employed. A CRC code, etc., may be used without being limited to the simple parity.

In l=2, k=0 to 99, an upper symbol ADu of an address signal, an upper symbol SBu of a subcode or upper symbols L0u, R0u of an audio PCM are contained corresponding to the block address. Specifically, in [l=2, k=4n+0, 4n+1, 4n+2, (n=0, 1, 2, ... 24)], the upper symbol ADu of the address signal is located, in [l=2, k=4n+3, (n=5, 6, 7, ... 22)], the upper symbol SBu of the subcode is positioned, in [l=2, k=4n+3, (n=23, 24)], the upper symbols L0u, R0u of the PCM data are disposed. The encoding process of the C2 code is performed only for SBu and L0u, R0u in these data, and five-symbol check data Q is disposed in the position of [l=2, k=4n+3, (n=0, 1, 2, 3, 4)]. The encoding process of the C2 code is not performed with respect to an upper symbol ADu of the address signal.

In l=3, k=0 to 99, a lower symbol ADl of the address signal, a lower symbol SBl, of the subcode or lower symbols L0l R0l of the subcode are contained. A similar encoding process of the C2 code to the above-mentioned data of l=2 is made with respect to this data except for the lower symbol ADl of the address signal. The subcodes SBl, SBl, are a time code which a user can employ, ID code of tape speed upon recording, ID code of stereo or bilingual, flags of copy prohibition and so on.

As stated above, no address signal is contained in a block in which the encoding of the C2 code is made in the header. A header in which an address signal is contained and a header in which audio data or a subcode is included and the C2 encoding is performed are distinguished by the check data E and its inversion data $\bar{E}$.

The encoding process of the C1 code is performed for all blocks (100 blocks) except for the synchronization signal (i.e. for block-in address l=1 to 47. The C1 code is the Reed-Solomon code of 47, 43, 5. The series of the C1 code is constructed so as to exist in two adjacent blocks. That is, one C1 series is formed by the odd-number designated symbols of the block-in address of two adjacent blocks. Another C1' series is formed by the even-number designated symbols of the block-in address. The reason why the C1 sequence is formed so as to exist in two blocks is to prevent two symbols in one C1 series from becoming errors due to errors generated at the boundary of two continuous symbols upon recording.

The encoding by the C1 code is similar to the method described in U.S. Pat. No. 4,630,272. The check data P (eight symbols) of the C1 code of adjacent blocks are arranged in blocks having an odd-number of the range of (k≧21) and are disposed in l=40 to 47. The encoding process of the C1 code is not performed with respect to the blocks k=0 to 19 in which the check data Q of the C2 code are included.

Upon reproduction, error detection and error correction are performed by the C1 code. A pointer is set for a block for which an error cannot be corrected, and error detection and error correction of the C2 code are made referring to the pointer. Additionally, upon reproduction, error detection on a header is performed by check data E and $\bar{E}$. These check data (referred to as a third redundant code) are generated respectively by adding (mod. 2) two symbols ADu and ADl which are located at k=0, two symbols of parity Q at k =19, two symbols SBu and SBl at k=23, two symbols L0u and L0l at k=95, and so on. On the reproduction side, a syndrome of a block, with the check data E added, has eight-bits of all "0's" in the absence of an error, whereas a syndrome of a block, with the check data $\bar{E}$ added, has eight-bits of all "1's" in the absence of an error. Due to the difference of the syndrome patterns, the difference in the content of the header can be detected.

B. One Example of a Data Interleave

FIG. 7 and FIG. 8 show an interleave of data of 801 words (3204 symbols in two channels) of one field of the NTSC system in detail. FIGS. 7A and 7B show a data constitution in the block address K=0 to 59. FIGS. 7C and 7D indicate k=60 to 99, and FIG. 8 shows those in the block addresses k=20, k=21 in detail.

As mentioned above, four symbols (L0u, L0l, R0u, R0l) of two words are positioned in l=2 and 3 at k=95 and 99. The odd-number designated words L1 to L799, R1 to R799 are arranged in l=4 to 47 at k=20 to 59. The even-number designated words L2 to L800, R2 to R800 are arranged in l=4 to 7 at k=60 to 99. By separating the recording positions of the even-number designated words and odd-number designated words, the poor effect caused upon reproduction when continuous words are error words can be reduced.

An example of the interleave of the symbols of the odd-number designated words will now be described. As shown in FIGS. 7A and 8, data are sequentially arranged from l=4, l=6. In this case, symbols (L1u, R1u, L3u, R3u, ... R19u) on the upper side are arranged in the even-number designated block addresses (k=20, 22, 24, 26 ... 58) in l=4. The symbols (L1l, R1l, L3l, R3l, ... R19l) on the lower side are sequentially arranged in the even-number designated block addresses (k=20, 22, 24, 26, ... 58) of an even-number of l=6. The next odd-number designated symbols are arranged in l=5, l=7 in a manner similar to the above. By repeating the data arrangement in this manner, the R799u and R799l are located in k=59, l=37 and 39.

In FIG. 8, P00 to P13 denote C1 parities regarding two blocks of k=20 and 21. That is, in the two blocks, parities of the C1 code P00, P01, P02, P03 are formed by the 47 symbols located in the odd-number designated block-in addresses. The parities of the C1' code P10, P11, P12, P13 are formed by the 47 symbols located in the even-number designated block-in addresses.

The even-number designated words are arranged as shown in FIGS. 7C and 7D in a manner similar to the odd-number designated words. The symbols R800u and R800l of the last word in the R channel are arranged in k=9, l=37 and 39. According to the interleave shown in FIG. 7 and FIG. 8, in each of the even-number designated word series and odd-number designated word series in each channel, the recording positions of adjacent words are interleaved by four blocks. Successive recording of the upper side symbol and the lower side symbol of one word is prevented. The influence of burst error is reduced.

C. Configuration of a Block

Figure 9A:
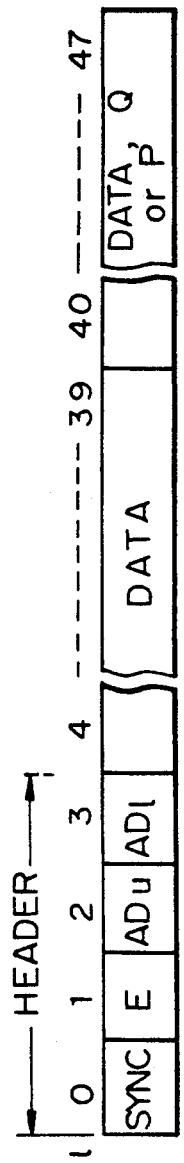
FIGS. 9A, 9B, 9C and 9D are diagrams of various block configurations.
Figure 9B:
Figure 9C:
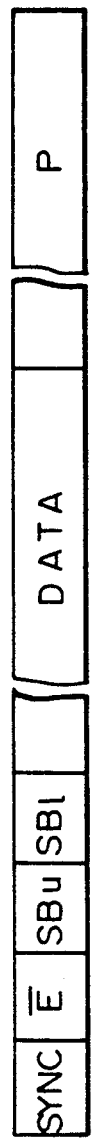

FIGS. 9A-9D show blocks formed by each column (vertical direction) in the above-stated frame configuration as shown in FIGS. 7A, 7B and 7D. Blocks whose block addresses k are [k=4n+0, 4n+1, 4n+2 (n=0, 1, 2, ... 24)] have a data configuration as shown in FIG. 9A. Blocks of [k=4n+3 (n=0, 1, 2, 3, 4)] have a data configuration as shown in FIG. 9B. Blocks of [k=4n+3 (n=5, 6, 7, ... 22)] have a data configuration as shown in FIG. 9C. Block 95 [k=4n+3 (n=23)] has a data configuration shown in FIG. 9D. Although not shown, block 99 [k=4n+3 (n=24)] is the one which has inserted R0u and R0l in place of data L0u and L0l of FIG. 9D.

Figure 9D:
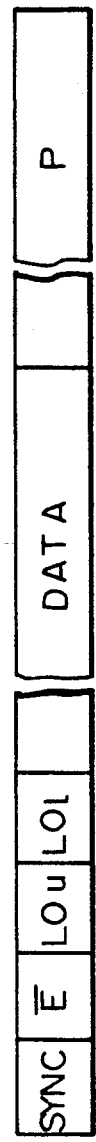

The block shown in FIG. 9A and the blocks shown in FIGS. 9B, 9C and 9D are distinguished based upon whether an address signal is contained in the header. Therefore, check data of the block (FIG. 9A) containing the address signal is treated as original data E and check data of the block (FIGS. 9B, 9C and 9D) containing no address signal is treated as $\bar{E}$.

Figure 10:
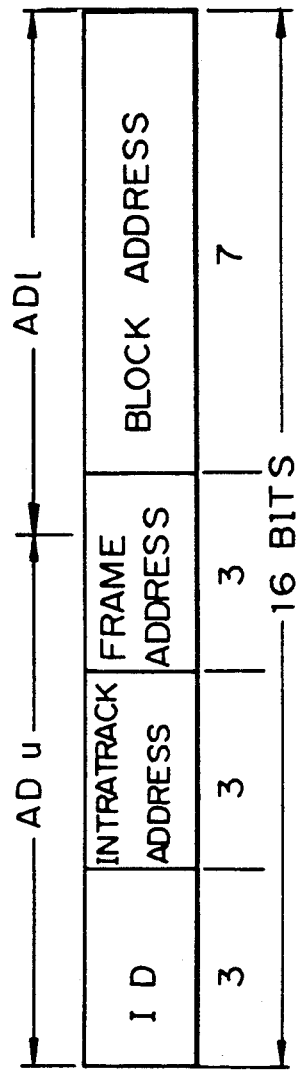
FIG. 10 is a diagram illustrating the contents of addresses.

FIG. 10 shows the contents of an address signal composed of an upper symbol ADu and a lower symbol ADl. The upper three bits in the upper symbol ADu are used as an identification code ID for searching a desirable scene in a tape, and the subsequent three bits (INTRATRACK ADDRESS) are used as a block-in address. The block-in address is employed for channel identification when one track is divided into six channels, as disclosed in U.S. Pat. No. 4,542,419. The next three bits are used as a frame address. The frame address is employed for selecting a desirable frame (track) upon high speed reproduction where the scanning of a rotation head is performed over plural tracks. A block address k is indicated by the lower seven bits in the lower symbol ADl. With respect to blocks into which the block addresses are not inserted, the correct block addresses can be reproduced by interpolation using the block addresses of the blocks before and after the block in question.

The above-mentioned identification code is used to identify the number of words contained in the frame configuration of the codes. Since 800 or 801 words per channel are included in the frame configuration in this embodiment, an identification code is used to distinguish them.

Since audio data of four symbols at the maximum can be inserted into a header, it is possible to set an asynchronous state absorbing margin of 10 words at the maximum per channel without being limited to the case where an asynchronous state absorbing margin of one word per channel is set, as in the above-mentioned embodiment. The foregoing margin is necessary in order to absorb the asynchronization between the video image and the audio sound which is caused by the ratio between the sampling frequency and the field frequency not being a whole integer.

D. PCM Recording Processing Circuit

This invention is applicable to a rotation head-type VTR which records a video signal and a PCM audio signal onto a magnetic tape by single scanning. A pair of rotational heads having an angular interval of 180° therebetween and rotated at a frame frequency (29.97 Hz in the case of the NTSC system) are mounted inside of a drum. The heads may be magnetic heads. The magnetic tape is run obliquely at constant speed over an angular range equal to or greater than 210°, with respect to the circumference of the heads. In this case, the rotation phases of the rotation heads are controlled so as to synchronize with the video signal to be recorded and the rotation heads are servo-controlled so as to correctly scan the track upon reproduction.

Therefore, with the scanning of each rotation head, a video section and a PCM section are formed. The frequency multiplexed signal of an FM luminance signal, a lower frequency band converted carrier chrominance signal, an FM audio signal and a pilot signal are recorded in the video section. Also, with respect to stereo audio signals L and R, the processing of error correction encoding and the processing of time-axis compression are performed by a PCM recording processing circuit. The output signal of the PCM recording processing circuit is recorded in a PCM section.

Meanwhile, upon reproduction, the frequency multiplexed signal and the PCM signal are alternately reproduced by the rotation heads. The reproduced frequency multiplexed signal is supplied to a video reproduction and processing circuit, and the PCM signal is given to a PCM reproduction processing circuit. A reproduced color video signal and stereo audio signals L and R are fetched out from these reproduction and processing circuits.

Figure 11:
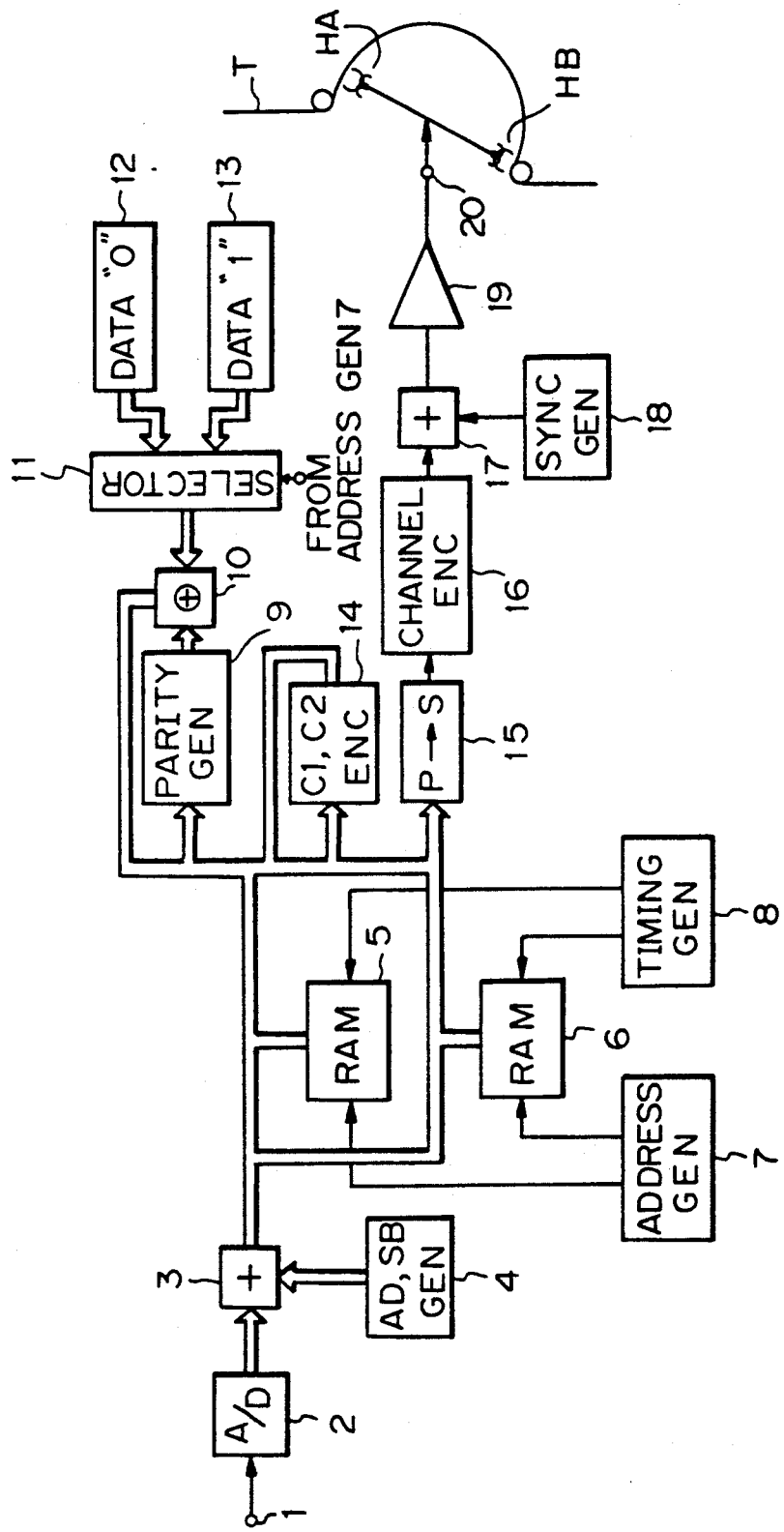
FIG. 11 is a block diagram of one example of a PCM record processing circuit.

An example of the PCM recording processing circuit will be described with reference to FIG. 11. In FIG. 11, an analog audio signal 1 is supplied to an input terminal of an A/D converter 2 where the analog audio signal 1 is converted into a PCM signal. The output data of the A/D converter 2 is supplied to an adder 3. The address signal and the subcode are supplied to the adder 3 from an address and subcode generator 4. The address and subcode are added to the PCM audio signal.

The output signal from the adder 3 is used as the data inputs to RAMs 5 and 6. Each of the RAMs 5 and 6 has a capacity sufficient to store the symbols of one frame. An address generating circuit 7 and a timing generating circuit 8 are provided in conjunction with the RAMs 5 and 6 and are controlled so as to write and read-out data into and from the RAMs 5 and 6 on a symbol unit basis. Two RAMs 5 and 6 are employed so that during the time when data is written into one of the RAMs, data is read out from the other RAM and error correction encoded. Also, time-axis compression processing with a compression ratio of (1/6) is done by the RAMs 5 and 6.

The PCM audio signal read out from one of the RAMs 5 and 6 is supplied to an encoder 14 of the C1 and C2 codes, and the parities of the C1 and C2 codes are formed. The parities are written into either one of the RAMs 5 and 6. A parity generating circuit 9 is provided, and a check data E of an error detection code for two symbols included in a header of each block is generated. The check data E is supplied to an adder of (mod. 2). The output of a "0" data generating circuit 12 or the output of a "1" data generating circuit 13 is supplied to the adder 10 through a selector 11. The selector 11 selectively supplies one of "0" data or "1" data depending on a block address from an address generating circuit 7.

Specifically, in the case of the block with the configuration as shown in FIG. 9A, the "0" data is selected by the selector 11, and in the case of blocks with the configuration shown in FIGS. 9B, 9C and 9D, the "1" data is selected by the selector 11. When the "0" data is given to the adder 10, no alteration is made to the check data E. When the "1" data is given to the adder 10, the check code E is inverted. The check code E or $\bar{E}$ is added to the block. After completion of the error correction encoding process, the digital signals consisting of check data, block address, subcode and data are read out from the RAMs 5 or 6, block by block, and they are supplied to a parallel-to-serial converter 15 where they are converted into serial data.

The output data from the parallel-serial converter 15 is supplied to a channel encoder 16. The channel encoder 16 is an (8-10) modulator for converting eight-bit data into ten-bit data so as to reduce a direct current component of the data sequence irrespective of data content. The channel encoder 16 is composed of a ROM storing a data conversion map. The output signal of the channel encoder 16 is supplied to a second adder 17, and in the second adder 17, a block synchronization signal is added to the output signal, which is then output as a PCM signal at an output terminal 20 via a recording amplifier 19. This output signal is recorded onto a magnetic tape T by rotary heads HA and HB. The magnetic tape T is wrapped obliquely around the peripheral surface of a drum over an angular range of 210°.

E. Modification

In this embodiment 800 and 801 have been used as two types of numerical value data. However, it is also possible to use numerical values of, e.g., 800 and 802 which are close to the quotient obtained when the sampling frequency fs is divided by the field frequency. On the other hand three or more numerical values can also be selectively used thereby not being limited to two values.

This invention is applicable to the case where a frame of error correction codes is comprised of a unit of one word or two words of L and R. In the invention, error correction codes other than the Reed-Solomon code can be used.

This invention can prevent the increase of redundancy due to the addition of an address signal to all blocks. In addition, this invention enables the formation of plural contents as headers containing a synchronization signal and an address signal other than a digital information signal. Therefore, the digital information signal, a subcode, etc., can be inserted in place of the address signal. As a result, by inserting the digital information signal into the header, the recording of the number of words, which, on an average, is equal to the quotient obtained when the sampling frequency is divided by the field frequency, can be performed. The occurrence of the asynchronization between a video image and audio sound can be prevented. Further, to distinguish the differences in content of the block, this invention employs a redundant code of an error detection code of a header and forms a redundant code so that values of syndromes are different. For this reason, the processing of an eight-bit-unit can be performed in contrast to the allotment of one bit of a redundant code to an identification. Also, another advantage of the invention is that the number of kinds of headers which can be distinguished are not limited to multiples of 2.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

I claim

1. A method of digitally recording an analog signal having a field frequency on a magnetic medium for reproduction by a reproduction device, comprising:

converting the analog signal into a digital signal by an analog to digital converter having a sampling frequency;

adding an error correction code to the converted digital data;

arranging the digital signal in frames of PCM data, each of which is a two-dimensional array composed of a plurality of blocks of data of the digital signal, such that each frame has a total number of elements which is close to the number obtained by dividing the sampling frequency by the field frequency;

adding to each block of data a header composed of a synchronization signal, auxiliary data which is either one of first data or second data and a redundant code which reflects whether the auxiliary data is the first data or the second data, the redundant code being composed of a sequence of all zeroes when the header contains the first data and a sequence of all ones when the header contains the second data so that upon reproduction of the recorded digital signal, when there is no error in the auxiliary data, the reproduction device can distinguish a block of data in which the first data is contained as auxiliary data from a block of data in which the second data is contained as auxiliary data; and magnetically recording the frames on the magnetic medium with rotational magnetic heads.

2. A method of digitally recording an analog signal having a field frequency on a magnetic medium for reproduction by a reproduction device, comprising:

converting the analog signal into a digital signal by an analog to digital converter having a sampling frequency;

adding an error correction code to the converted digital data;

arranging the digital signal in frames of PCM data, each of which is a two-dimensional array composed of a plurality of blocks of data of the digital signal, such that each frame has a total number of elements which is close to the number obtained by dividing the sampling frequency by the field frequency;

encoding a first error detection code or first error correction code with respect to the vertical direction to form a first redundant code;

encoding a second error detection code or second error correction code with respect to the horizontal direction to form a second redundant code;

adding to each block of data a header composed of a synchronization signal, auxiliary data which is either one of first data or second data, and a third redundant code;

encoding the first data using the first error detection code or first error correction code, and encoding the second data using both the first error detection code or first error correction code and the second error detection code or second error correction code; and further wherein the third redundant code is composed of a sequence of all zeroes when the header contains the first data and a sequence of all ones when the header contains the second data or the second redundant code to reflect, when the block of data is reproduced, whether the auxiliary data is either the first data or the second data or the second redundant code so that upon reproduction, when there is no error in the auxiliary data, a reproduction device can distinguish a block of data in which the first data is contained as auxiliary data from a block of data in which either the second data or the second redundant code is contained as auxiliary data;

magnetically recording the frames on the magnetic medium with rotational magnetic heads.

* * * * *